United States Patent [19]

Simich

[11] 4,103,881

[45] Aug. 1, 1978

[54] LOAD REGULATOR

[76] Inventor: Irene C. Simich, 5555 N. Sheridan Rd., Chicago, Ill. 60640

[21] Appl. No.: 722,658

[22] Filed: Sep. 13, 1976

[51] Int. Cl.² ............................................. F16F 1/12
[52] U.S. Cl. ................................ 267/177; 248/54 R; 248/162; 267/178
[58] Field of Search ............. 267/177, 170, 174, 175, 267/178; 269/310, 254 CS; 73/161, 94, 89; 248/54, 162

[56] References Cited

U.S. PATENT DOCUMENTS

| 2,540,525 | 2/1951 | Howarth et al. | 267/177 |
| 2,593,538 | 4/1952 | Cleveland | 269/310 |
| 2,684,855 | 7/1954 | Wales et al. | 269/254 CS |
| 3,572,621 | 3/1971 | Whitten et al. | 267/178 |

*Primary Examiner*—James B. Marbert
*Attorney, Agent, or Firm*—J. Patrick Cagney

[57] ABSTRACT

A load regulator is adjustably mounted in a machine for loading a workpiece and comprises inverted telescoping cup-shaped piston and cylinder elements defining a variable length chamber for a coil spring. Cooperating indicia on the piston and cylinder provide a direct readout scale to indicate the actual load force applied to the workpiece in proportion to the compression of the coil spring.

7 Claims, 2 Drawing Figures

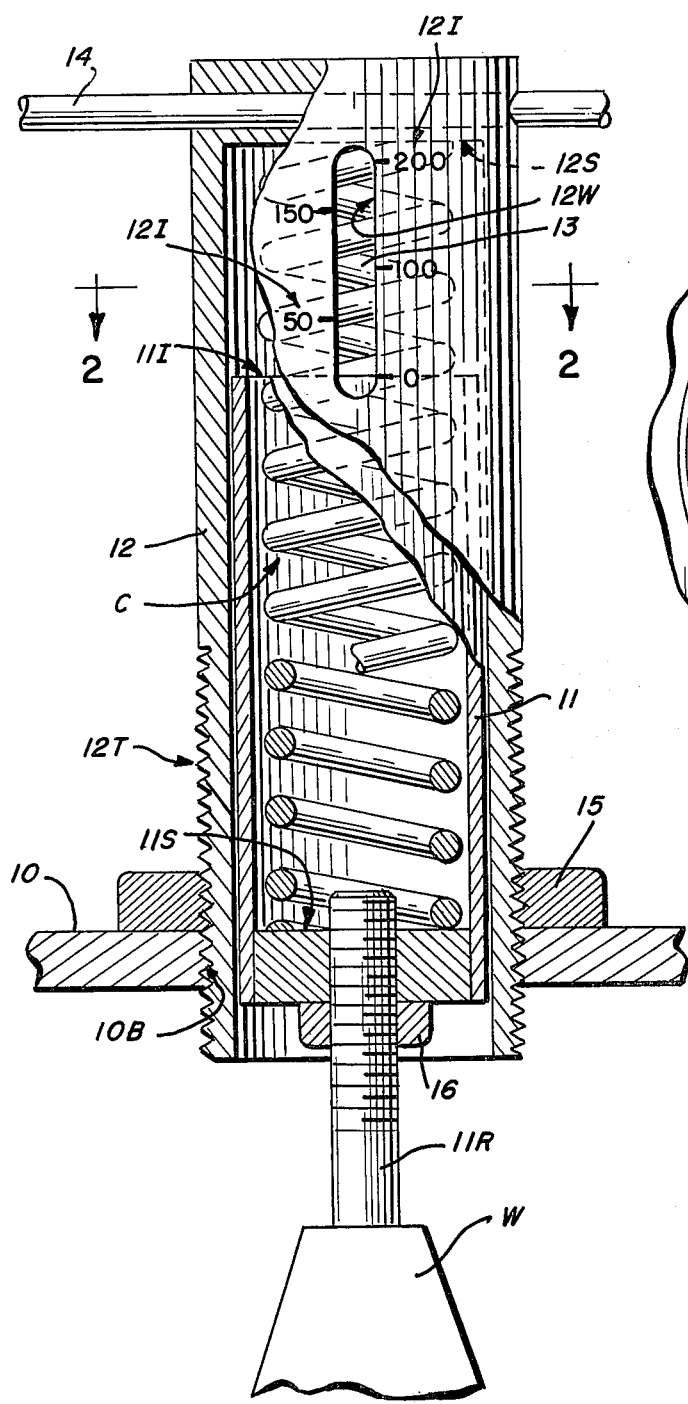

LOAD REGULATOR

BACKGROUND OF THE INVENTION

This invention relates to load regulators for use in machine arrangements where a load is to be applied to a workpiece in a fashion that presents an indication of the load at all times and that permits regulation of the load.

Load regulators for this purpose normally are in the form of air cylinders which require plumbing, air filters, regulators, pressure gauges and lubricators to accomplish the function of applying a controlled pressure to a workpiece or a machine part or other device. The relatively expensive assembly of components required for the air pressure-type regulators has usually been justified on the basis that it enables the operator to read a pressure gauge as a measure of the load being applied to the workpiece.

In addition to the undue expense of these current systems, the air pressure-type regulators usually lack a direct readout of the actual force applied to the workpiece.

Thus, there is a need for simplified load regulators which are easier to adjust and which provide a direct readout of actual load force.

SUMMARY OF THE INVENTION

The present invention provides an improved coil spring-type load regulator which provides a readout in terms of force based on the fact that the spring deflection is proportionate to the load.

More particularly the invention is concerned with the machine arrangement for controlling the load applied to a workpiece wherein an improved load regulator is mounted to act between the machine and the workpiece for applying a load to the workpiece and comprising cooperating piston and cylinder means defining a variable length chamber, a coil spring disposed in the chamber to react between the piston and cylinder means and change in length in unison therewith for applying a load from the piston means to the workpiece, said piston and cylinder means having cooperating cylinder indicia and piston indicia means arranged to indicate the value of the load in proportion to the length of the coil spring, and means to axially adjust the position of the cylinder means relative to the machine in accordance with the value registered by the indicia to set the load applied to the workpiece by the piston means.

In the specific embodiment disclosed herein the piston and cylinder are each cup-shaped and disposed in inverted telescoping relation. The cylinder is externally threaded and is engagable with a threaded machine mounting bore to enable axial adjustment of the regulator by screwing the entire assembly towards the workpiece, thus duplicating the familiar action of an air-loaded cylinder-type of load regulator. The cylinder has an elongted window at a region of the chamber traversed by the piston and bordered by indicia defining a scale in terms of load force. The piston has cooperating indicia, for example, the brim or open end of the piston serves as a reference line indicating the particular load being applied through the coil spring in accordance with the position of the piston relative to the scale.

Other features and advantages of the invention will be apparent from the following description and claims, and are illustrated in the accompanying drawings which show structure embodying features of the present invention and the principles thereof.

BRIEF DESCRIPTION OF THE DRAWINGS

In the accompanying drawings forming a part of the specification, and which like numerals are employed to designate like parts throughout the same:

FIG. 1 is an elevational view showing a machine arrangement incorporating a spring load regulator in accordance with this invention;

FIG. 2 is a section taken as indicated on the line 2—2 of FIG. 1.

DESCRIPTION OF PREFERRED EMBODIMENT

Referring now to the drawings a machine arrangement for applying load to a workpiece W is shown wherein a machine base or housing indicated at 10, is provided with a threaded bore 10B for accomodating the spring load regulator of this invention designated generally as R.

In accordance with the presently preferred practice of the invention a simplified regulator is provided in the form of a cooperating piston 11 and cylinder 12 that define a variable length chamber C for a coil spring 13 that reacts between piston spring set 11S and a cylinder spring seat 12S to serve as a load determining device.

In the specific regulator embodiment shown for purposes of illustrative disclosure, the cylinder 12 is in the form of a cup-shaped member having external threading 12T for screw mounting in the threaded bore 10B to enable axial adjustment of the cylinder position, thereby setting the load applied to the workpiece by the piston 11. Preferably, the cylinder includes a T-handle 14 at its upper end to facilitate screw adjustment of the axial position of the regulator. A knurled lock nut 15 is shown threaded onto the cylinder to lock it in any given position of adjustment.

The piston 11 is also a cup-shaped member and is mounted in inverted telescoping relation in the cylinder so that one end of the coil spring 13 is received within and acts against the end wall 12S of the cylinder and the other end of the coil spring is received within and reacts against the end wall 11S of the piston. The piston includes a projecting rod 11R shown here as a threaded stud secured in a threaded bore in the piston end wall and held by a suitable nut 16, the end face of the piston rod being in direct contact with the workpiece W. The reaction of the workpiece as the regulator is screwed axially in the machine to move the piston against the workpiece compresses the spring and reduces the length of the chamber C defined by the end walls of the piston and cylinder.

An important convenience of the arrangement is that the actual forces applied to the workpiece are directly indicated by cooperating indicia on the piston and cylinder. In the preferred embodiment the cylinder 12 has a calibrated window 12W along its upper region with the indicia 12I indicating the load in terms of pounds of force. The piston indicia 11I in the disclosed arrangement, is merely the reference line constituted by the brim or upper end/edge of the cup-shaped piston.

As shown in the drawing where the spring 13 is extended its full length, such that the spring load is zero, the piston brim 11I is aligned with the "0" indicia on the calibrated window. To set any particular value, the cylinder is rotated into the machine bore while the piston and spring may rotate in unison with the cylinder or may slip relative to the cylinder as desired. Suitable thrust washers may be provided at either end of the spring to provide slip control as desired. The travel of the piston brim traverses the range of the window depending upon the value of the spring load which is set by screwing the cylinder 12 into the machine bore.

It will be noted that if the workpiece were at a different spacing relative to the machine housing 10 the regulator R can be adjusted axially as a unit. In all cases the regulator is easily set at the load value desired as determined by the calibrated window which indicates directly the load forces applied through the spring 13 and piston 11.

Thus, while preferred constructional features of the invention are embodied in the structure illustrated herein, it is to be understood that changes and variations may be made by those skilled in the art without department from the spirit and scope of the appended claims.

What is claimed is:

1. In a machine arrangement for accurately setting the load applied to a workpiece, an improved load regulator mounted to act between the machine and the workpiece for applying a load to the workpiece and comprising cooperating piston and cylinder means defining a variable length chamber, a coil spring disposed in the chamber to react between the piston and cylinder means and change in length in unison therewith for applying a load from the piston means to the workpiece, said piston and cylinder means having cooperating cylinder indicia and piston indicia arranged to indicate the value of the load in proportion to the length of the coil spring, and means to axially adjust the position of the cylinder means relative to the machine in accordance with the value registered by the indicia to set the load applied to the workpiece by the piston means, said cylinder means having external threads engageable with a threaded machine mounting bore to enable axial adjustment of the position of the cylinder means for setting the load to be applied to the workpiece.

2. In a machine arrangement as defined in claim 1 wherein said piston means is cup-shaped to receive one end of the coil spring and is disposed in telescoping relation to the cylinder means.

3. In a machine arrangement as defined in claim 1 and wherein said cylinder means has an elongated window located at a region of the chamber that is traversed by the piston means and bordered by cylinder indicia to indicate the load applied to the workpiece directly in accordance with the position of the piston indicia relative to the cylinder indicia.

4. In a machine arrangement as defined in claim 1 and wherein said cylinder means is cup-shaped to receive one end of the spring and said piston means is cup-shaped and disposed in inverted telescoping relation to the cylinder means to receive the other end of the spring.

5. In a machine arrangement as defined in claim 4 and wherein said cylinder means has an elongated window located at a region of the chamber that is traversed by the piston means and bordered by cylinder indicia to indicate the load applied to the workpiece directly in accordance with the position of the piston indicia relative to the cylinder indicia.

6. In a machine arrangement for accurately setting the load applied to a workpiece, an improved load regulator mounted to act between the machine and the workpiece for applying a load to the workpiece and comprising cooperating piston and cylinder means defining a variable length chamber, a coil spring disposed in the chamber to react between the piston and cylinder means and change in length in unison therewith for applying a load from the piston means to the workpiece, said piston and cylinder means having cooperating cylinder indicia and piston indicia arranged to indicate the value of the load in proportion to the length of the coil spring, and means to axially adjust the position of the cylinder means relative to the machine in accordance with the value registered by the indicia to set the load applied to the workpiece by the piston means, said cylinder means being cup-shaped to receive one end of the spring, said cylinder means having external threads engageable with a threaded machine mounting bore to control axial adjustment of the position of the cylinder means, said piston means being cup-shaped to receive the other end of the coil spring and slidably and rotatably disposed in inverted telescoping relation in the cylinder means.

7. In a machine arrangement as defined in claim 6 and wherein said cylinder means has an elongated window located at a region of the chamber that is traversed by the piston means and bordered by cylinder indicia to indicate the load applied to the workpiece directly in accordance with the position of the piston indicia relative to the cylinder indicia.

* * * * *